UNITED STATES PATENT OFFICE.

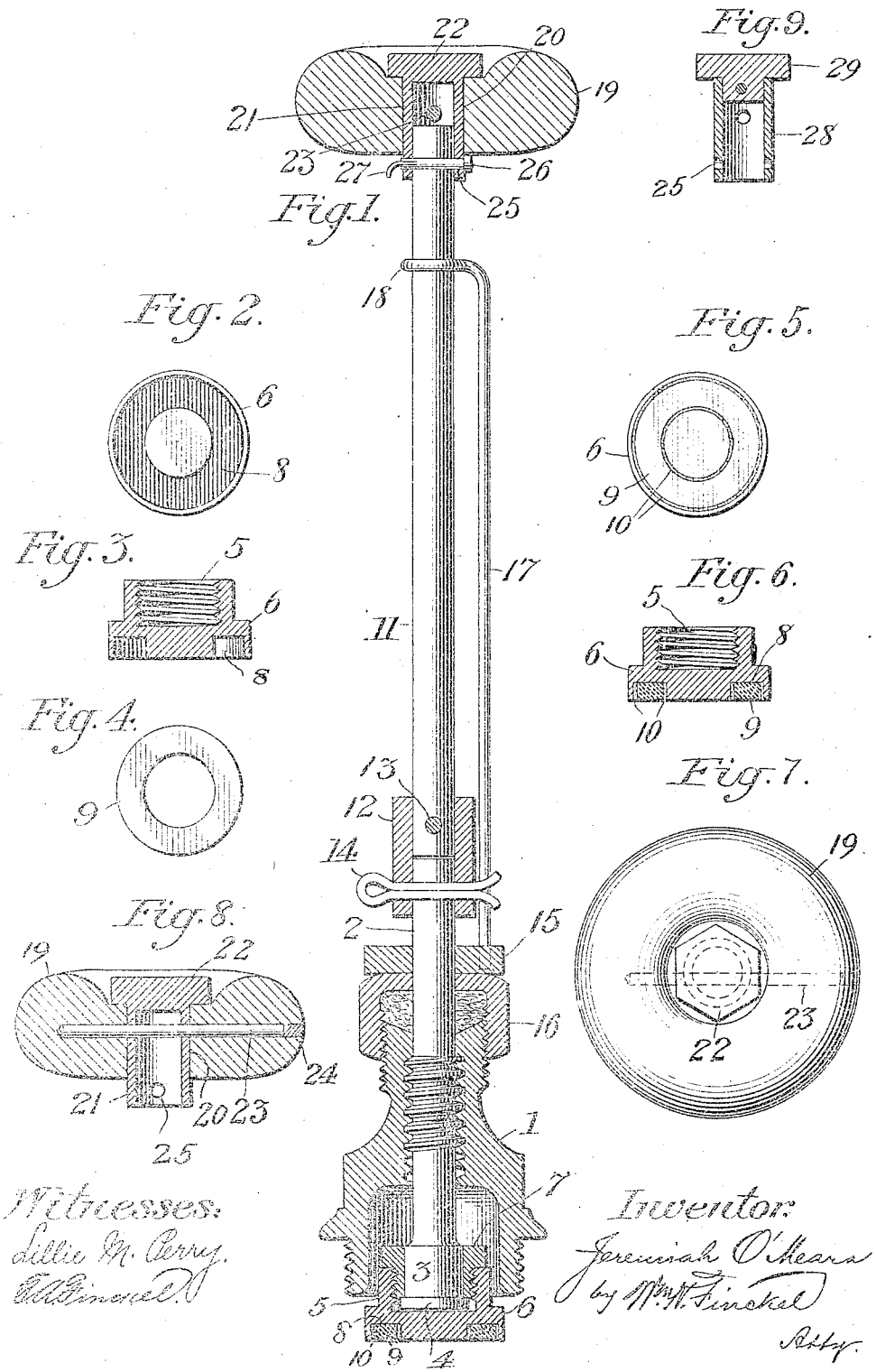

JEREMIAH O'MEARA, OF NEW YORK, N. Y.

VALVE.

935,856.  Specification of Letters Patent.  Patented Oct. 5, 1909.

Application filed April 29, 1908. Serial No. 429,971.

*To all whom it may concern:*

Be it known that I, JEREMIAH O'MEARA, a citizen of the United States, residing at New York, in the county of New York and State of New York, have invented a certain new and useful Improvement in Valves, of which the following is a full, clear, and exact description.

The object of this invention is to provide a globe, angle, or other valve, especially for use on steam radiators, but applicable to other apparatus, designed to effect economy in the manufacture, installation, use and repair of such valves.

It is desirable to have the valve stem of radiator valves and valves similarly placed low down, or in relatively inaccessible locations, extended to such a height as to be of easy access, and it not infrequently happens that such valve stems may be as much as three or four feet long.

In order to economize in the production of such valve stems, one feature of the invention consists in a valve stem extension having means to couple it to the valve stem which immediately carries the disk, and a stay-rod or other brace or bracket to engage the extension stem some distance beyond the valve itself and aid it in standing upright.

It is desirable to provide a hand-wheel or other equivalent valve-operating means of simple construction and attachable to the valve stem in an inconspicuous manner, for economy sake and to prevent the unauthorized removal of the wheel. And to this end, another feature of the invention consists in a valve stem operating wheel or other device provided with a socket piece fitted to the wheel by means of a transverse pin piercing both the wheel and the socket piece. The extension stem is fitted in this socket, and both the socket and the stem are perforated below the wheel to receive a detachable pin applied to them.

In the accompanying drawings, illustrating the invention, in the several figures of which like parts are similarly designated, Figure 1 is a longitudinal sectional elevation illustrating the several features of the invention. Fig. 2 is a bottom plan view of the disk. Fig. 3 is a transverse section of the disk. Fig. 4 is a plan view of the packing. Fig. 5 is a bottom plan view of the packed disk. Fig. 6 is a transverse section of the packed disk. Fig. 7 is a top plan view of the hand-wheel. Fig. 8 is a cross-section of the hand-wheel taken at right angles to the section shown in Fig. 1. Fig. 9 is a longitudinal section of a modification of the wheel fastening.

As already sufficiently indicated, the invention is applicable to globe, angle and other valves, and hence I have not shown the valve body, but only one form of valve bonnet. This bonnet, designated 1, is shown as screwthreaded to receive a reciprocating valve stem 2. The end 3 of the valve stem is provided with a flange 4 to enter a socket 5 of the valve disk 6, and to receive above it a nut 7 by means of which the disk is swiveled to the stem; but the invention is not limited to this means of connecting the disk with the stem.

The disk is made with an annular groove 8 of any desired depth to receive the packing; and as here shown, the preferred packing consists of a ring 9 preferably of copper or other metal relatively softer than the valve seat, and of considerably less diameter than the groove 8 so that the packing may be brazed in the groove, or secured therein by solder, as indicated at 10 in Figs. 1, 5 and 6. This solder is interposed between the ring and sides of the groove, as indicated in Fig. 6, and thus the packing ring and the disk are so securely connected as to prevent accidental detachment under the strains of use.

I have found that a copper ring will outlast any of the ordinary packing compositions commonly used, and will insure a tight joint throughout its lifetime.

After the ring has been brazed or soldered in the disk, the disk may be faced off or ground in any usual way, and this face may be reground as often as it may be necessary and as long as there is sufficient packing to make an efficient seal on the valve seat.

In addition to the advantages already stated as accruing from the use of the copper packing or packing of other metal softer than the valve seat, it is found that such a packing will not permit the steam to get under the metal ring, and will not permit the steam to by-pass. In other words, the construction affords an absolute steam-tight fit of the valve on its seat.

The stem of the valve may be extended to any desired length, but in order to use valves now on the market, and having short stems, in places where a long stem is desired, I provide an extension 11 for the stem, having at one end a coupling member 12, secured to it in any suitable manner, as by pin 13, and this coupling member is adapted to be fitted onto the stem 2 of the valve and connected with it permanently or in a detachable manner; and one such detachable expedient is shown as a cotter pin 14 passed transversely through holes in the coupling and stem 2. Such an extension stem may be of any desired length, so that a valve placed low down or in an inconvenient position, can be operated from a convenient position without stooping. When an extension stem of any considerable length is thus employed, it is advisable to brace it, and this may be done by a projection from the valve itself, or from the radiator or other convenient stationary element, but I prefer to mount a bracket 15 on the valve stem 2 above or below the gland 16, and on this bracket is mounted a rod or other suitable brace 17, extending from the bracket at any desired height on the extension stem and having an eye 18 engaging the extension stem at such elevated point. By this provision, the extension stem is held upright and braced against accidental displacement.

The hand-wheels of radiator valves are ordinarily made of wood or other non-heat-conducting substance, secured to the valve stems either by screws or screws and nuts which are exposed and liable to be run off in operating the valves and to be maliciously detached. To provide against these contingencies and to secure an economical construction, I provide the hand-wheel 19, of any material, with a central circular hole 20, and in this hole is placed a tube or socket 21, having a false nut or other concealed or exposed finish 22, and this socket is secured in the wheel by means of a transverse concealed pin 23 driven in transversely and the end of the hole plugged as at 24, Fig. 8, or not as desired. This socket extends below the wheel and is provided with transverse holes 25 to receive a pin 26, which passes through said holes and through a hole in the extension stem. The means for connecting the handle to the extension stem may be of any approved construction, but I prefer to use a pin 26 having an inserted flexible end-piece 27, which after the pin is inserted may be bent down so as to secure it in position.

Instead of making this socket in one integral piece, as shown, and of brass or nickel, or other relatively expensive metal, I may make it in two pieces as shown in Fig. 9, and in that event the cylindrical portion 28 is of iron, and inserted in it in any suitable way is a finishing cap 29 of brass or nickel or other plated metal.

In either of the forms of wheel attaching devices described, I have the advantage of simulating the ordinary constructions wherever that is desired, with the security afforded by the blind or concealed fastening, so that malicious removal of the wheel is discouraged if not prevented.

What I claim is:—

1. An improvement in valves, consisting of a valve stem and a valve disk thereon, combined with an extension stem coupled to said disk stem, and a brace for said extension stem.

2. An improvement in valves, consisting of a valve stem and a disk thereon, combined with an extension stem coupled to the disk stem, a bracket mounted on the disk stem below the coupling and having a brace extending thence lengthwise of the extension stem and engaging the extension stem at a distance from the disk stem.

3. In a valve, the combination with a valve-stem, of an operating wheel having a blind fastening composed of a socket inserted in the wheel from the face side and a concealed pin inserted transversely through the wheel and socket for connecting them.

4. In a valve, the combination with a valve-stem, of a hand-wheel, a blind socket inserted therein from the face side, a concealed fastening arranged transversely in the socket and wheel for connecting them, and a flexible pin adapted to be inserted through and connect the wheel and valve-stem when the socket has been placed upon the valve-stem.

In testimony whereof I have hereunto set my hand this 23d day of April A. D. 1908.

JEREMIAH O'MEARA.

Witnesses:
WALTER L. CLARK,
GEO. W. M. CLARK,
MAY F. CLARK.